(12) United States Patent
Pelagatti et al.

(10) Patent No.: US 12,736,101 B2
(45) Date of Patent: Sep. 15, 2026

(54) VIBRATION DAMPER AND VIBRATING CONVEYOR SYSTEM

(71) Applicant: ROSTA AG, Hunzenschwil (CH)

(72) Inventors: Marco Pelagatti, Veltheim (CH); Iris Bolliger, Schafisheim (CH); Ivan Vovchok, Schaffhausen (CH); Patrick Baumann, Olten (CH)

(73) Assignee: ROSTA AG, Hunzenschwil (CH)

( * ) Notice: Subject to any disclaimer, the term of this patent is extended or adjusted under 35 U.S.C. 154(b) by 131 days.

(21) Appl. No.: 18/867,858

(22) PCT Filed: Mar. 9, 2023

(86) PCT No.: PCT/EP2023/056067
§ 371 (c)(1),
(2) Date: Nov. 21, 2024

(87) PCT Pub. No.: WO2023/232302
PCT Pub. Date: Dec. 7, 2023

(65) Prior Publication Data

US 2026/0185579 A1 Jul. 2, 2026

(30) Foreign Application Priority Data

May 30, 2022 (EP) .................................... 22176071

(51) Int. Cl.
*F16F 3/087* (2006.01)
*B65G 27/08* (2006.01)
*B65G 27/18* (2006.01)

(52) U.S. Cl.
CPC ............ *F16F 3/0876* (2013.01); *B65G 27/08* (2013.01); *B65G 27/18* (2013.01);
(Continued)

(58) Field of Classification Search
CPC ............... F16F 3/0876; F16F 2224/025; F16F 2236/08; F16F 2238/024; B65G 27/08; B65G 27/18
(Continued)

(56) References Cited

U.S. PATENT DOCUMENTS 8,464,861 B2 * 6/2013 Bonn .................... B65G 27/08
198/758

FOREIGN PATENT DOCUMENTS

| | | |
|---|---|---|
| BE | 514289 A | 10/1952 |
| CN | 101769355 A | 7/2010 |
| CN | 207393820 U | 5/2018 |

OTHER PUBLICATIONS

CN 106402226 A (Year: 2017).*
(Continued)

*Primary Examiner* — Gene O Crawford
*Assistant Examiner* — Lester Rushin, III
(74) *Attorney, Agent, or Firm* — Collard & Roe, P.C.

(57) ABSTRACT

A vibration damper includes four torsion spring elements and two lever elements. Each torsion spring element has an inner part, an outer part and at least one resilient element. The inner part is located in the outer part. The resilient element is located between the inner part and the outer part and supports the inner part relative to the outer part such that a restoring force is created between the inner part and the outer part in the event of a deflection caused by rotation of the inner part and the outer part relative to one another. The torsion spring elements are located one above the other with respect to a first direction. The lever elements interconnect the torsion spring elements in a crosswise manner.

8 Claims, 5 Drawing Sheets

Figure 1:
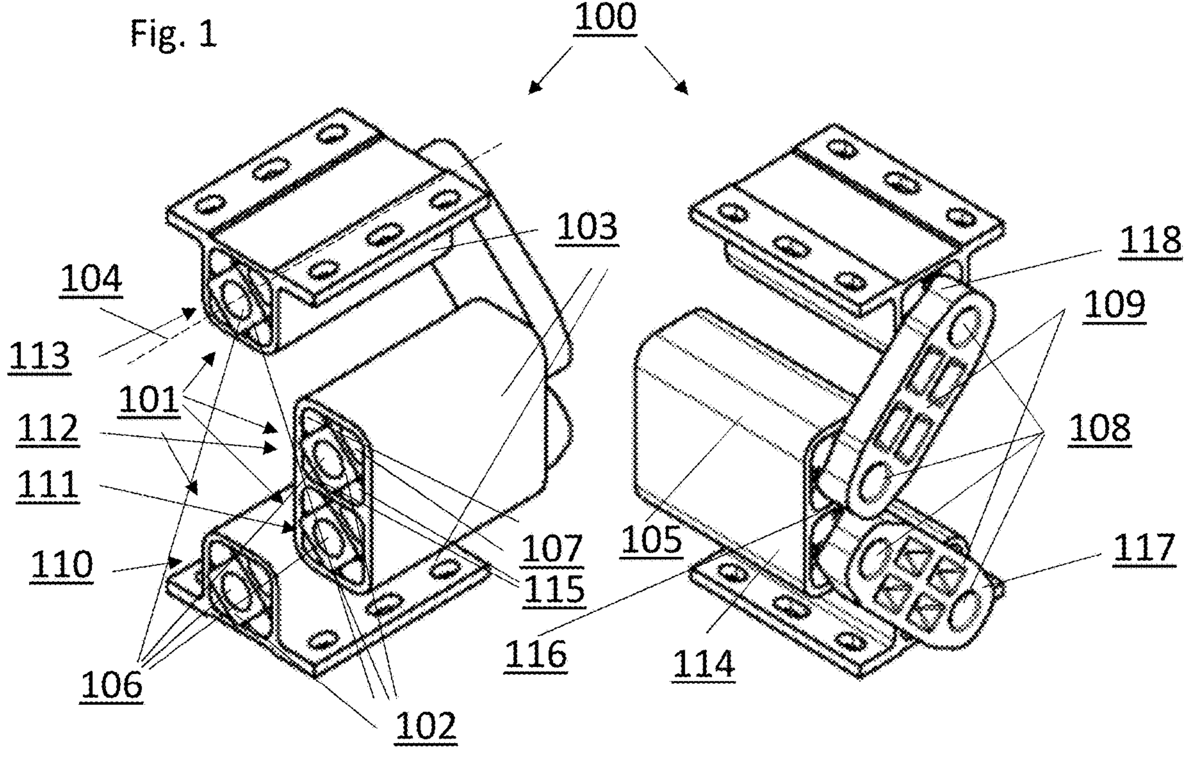

(52) U.S. Cl.
CPC ..... *F16F 2224/025* (2013.01); *F16F 2236/08* (2013.01); *F16F 2238/024* (2013.01)

(58) Field of Classification Search
USPC .......................................................... 198/760
See application file for complete search history.

(56) References Cited

OTHER PUBLICATIONS

UA147581 (Year: 2021).*
207393820 (Year: 2018).*
CN101769355 (Year: 2010).*
CN109345960 (Year: 2019).*
International Search Report in PCT/EP2023/056067, mailed May 3, 2023.

* cited by examiner 200
103
104
113
121
122
109
120
114
102
117
112
111
101
116
102
107,
115
110
109
118
108
119

300
113
104
103
101
118
109
120
112
111
109
108
119
114
117
116
102
102
110
107,
115

500
121
123
114
200
101
200
124
109

VIBRATION DAMPER AND VIBRATING CONVEYOR SYSTEM

CROSS REFERENCE TO RELATED APPLICATIONS

This application is the National Stage of PCT/EP2023/056067 filed on Mar. 9, 2023, which claims priority under 35 U.S.C. § 119 of European Application No. 22176071.3 filed on May 30, 2022, the disclosure of which is incorporated by reference. The international application under PCT article 21(2) was not published in English.

The present invention relates to a vibration damper and a vibrating conveyor system.

Vibration dampers are known from the prior art. Vibration dampers can be used for example in vibrating conveyor systems, for example in linear- or circular vibrators of vibratory systems. An aim in vibration dampers consists in reducing an inherent frequency of vibration dampers, increasing their load capacity and improving their stability.

An object of the present invention consists in providing an improved vibration damper and an improved vibrating conveyor system. This problem is solved by a vibration damper and a vibrating conveyor system having the features of the respectively independent claims. Advantageous further developments are indicated in dependent claims.

A vibration damper which is described here has four torsion elements. Each torsion element has an inner part, an outer part and at least one resilient element. The inner part is located in the outer part. The resilient element is located between the inner part and the outer part and supports the inner part relative to the outer part such that a restoring force is created between the inner part and the outer part in the event of a deflection of the inner part and of the outer part relative to one another. The torsion spring elements are located one above the other with respect to a first direction. A second torsion spring element is located above a first torsion spring element. A third torsion spring element is located above the second torsion spring element. A fourth torsion spring element is located above the third torsion spring element. The outer part of the first torsion spring element is configured for the rigid connection of the vibration damper. The inner part of the first torsion spring element is rigidly connected to the inner part of the third torsion spring element. The second torsion spring element is rigidly connected to the third torsion spring element. The inner part of the second torsion spring element is rigidly connected to the inner part of the fourth torsion element. The outer part of the fourth torsion element is configured for the rigid connection of the vibration damper.

Through the fact that the first lever element connects the first torsion spring element to the third torsion spring element, and the second lever element connects the second torsion spring element to the fourth torsion spring element, the torsion spring elements are interconnected in a crosswise manner. Compared to an arrangement in which the first lever element connects the first torsion spring element to the second torsion spring element, and the second lever element connects the third torsion spring element to the fourth torsion spring element, a height of the vibration damper measured along the first direction is reduced.

Advantageously, an object which is to be supported in a spring-mounted manner, for example a vibrating mass of a vibrating conveyor system, can be thereby supported such that a centre of gravity is formed particularly near to a base to which the vibration damper is able to be connected. Thereby, a system with such vibration dampers is more stable and more secure in operation.

At the same time, the vibration damper makes it possible to use longer lever elements with comparable height of the vibration damper. Thereby, an inherent frequency of the vibration damper can be particularly small, whereby a wear of the vibration damper in operation of a system which is vibrating and is damped by the vibration damper is reduced. The greater spring deflection and thus lower inherent frequency guarantee a greater vibration reduction. The insulating effect through the vibration elements is greater.

On the other hand, the connection of the torsion spring elements to the lever elements in a crosswise manner makes it possible that an angle formed by the lever elements can be enlarged with consistent height of the vibration damper, in order to increase a load capacity of the vibration damper.

In an embodiment, the torsion spring elements are rigidly connected to one another via lever elements. The first lever element and the second lever element are located along a longitudinal direction running perpendicularly to the first direction on opposite sides of the torsion spring elements. Advantageously, this arrangement enables the connecting of the torsion spring elements to the lever elements in a crosswise manner. ((FIG. 2))

In an embodiment, the torsion spring elements are rigidly connected to one another via lever elements. The first lever element and the second lever element are located along a longitudinal direction, running perpendicularly to the first direction, on one side on the torsion spring elements. Advantageously, this arrangement enables a simple arranging of resilient elements between the inner parts and the outer parts, as the torsion spring elements are accessible at a side facing away from the lever elements. ((FIG. 1))

In an embodiment, the lever elements are configured in an angled and/or bent manner. Advantageously, thereby a height of the vibration damper, measured in first direction, can be reduced, whereby the vibration damper is configured more rigidly and for example, on use in a vibrating conveyor system, can withstand higher stresses. This is enabled in that a distance of a centre of gravity of a spring-mounted vibrating mass is reduced with respect to a base. ((FIG. 3))

In an embodiment, the lever elements are arranged engaging into one another. Advantageously, this enables a one-sided arrangement of the lever elements with respect to the torsion elements. ((FIG. 4))

In an embodiment, the torsion spring elements are arranged symmetrically with respect to a plane running perpendicularly to the first direction. Advantageously, forces acting in the case of stresses distribute themselves uniformly onto the torsion spring elements, whereby the vibration damper can be utilized in a particularly efficient manner.

In an embodiment, each outer part of the torsion spring elements has a hollow polygonal profile. Each inner part of the torsion spring elements has a polygonal profile. Respectively, an inner part is arranged in an outer part of a torsion spring element such that outer edges of the inner parts are arranged respectively facing inner faces of the outer parts. Each torsion spring element has a plurality of resilient elements arranged between the inner part and the outer part. The resilient elements lie respectively adjacent to outer faces of the inner part and adjacent to inner faces and/or inner edges of the outer part.

A vibrating conveyor system has a vibrating mass and a plurality of vibration dampers according to one of the mentioned embodiments. Each vibration damper is able to be connected to the vibrating mass and to a base.

The idea on which the vibration damper is based is explained more closely in the following description, in connection with schematic drawings.

Figure 2:
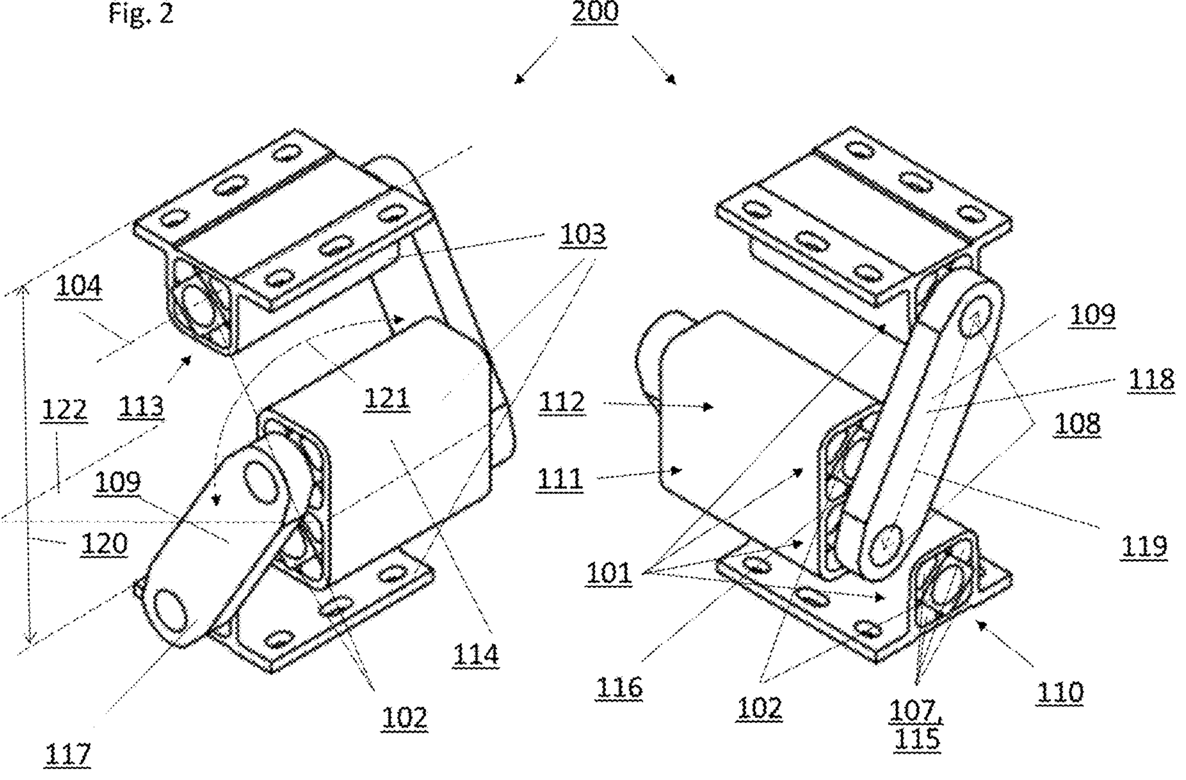
Figure 3:
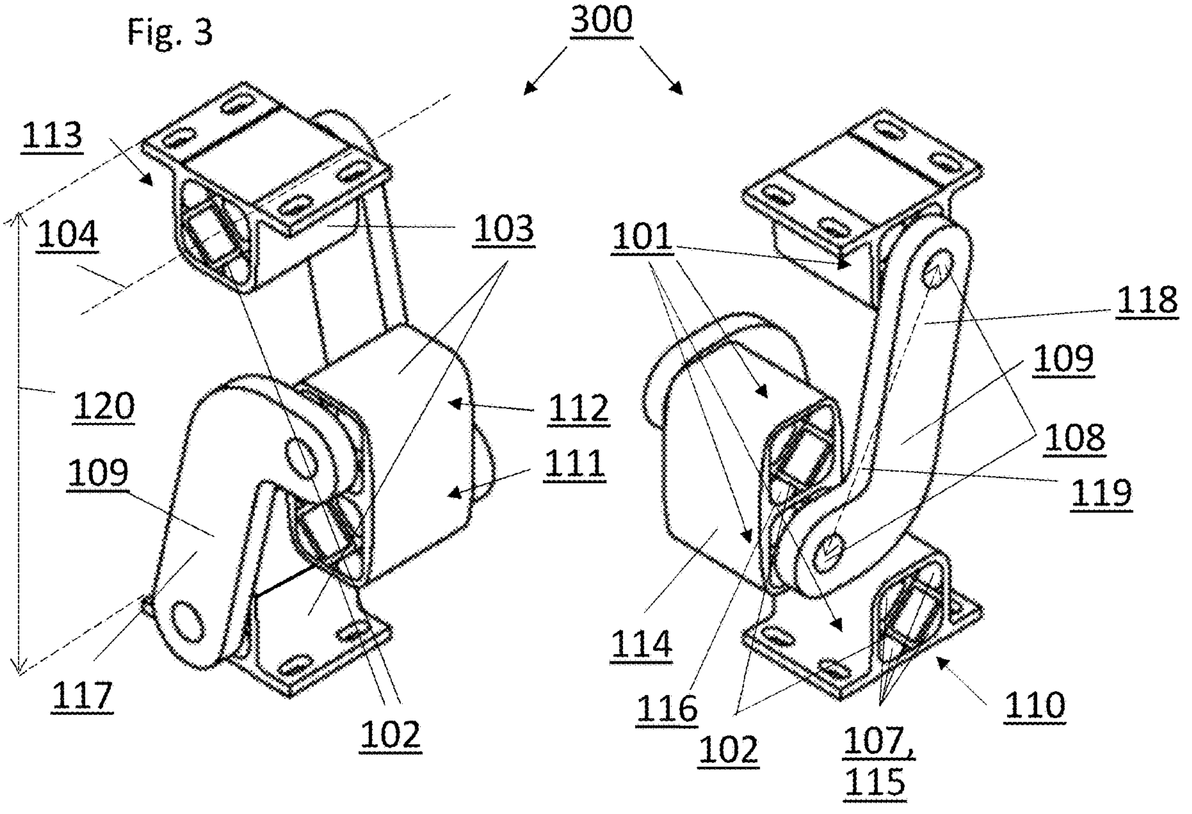
Figure 4:
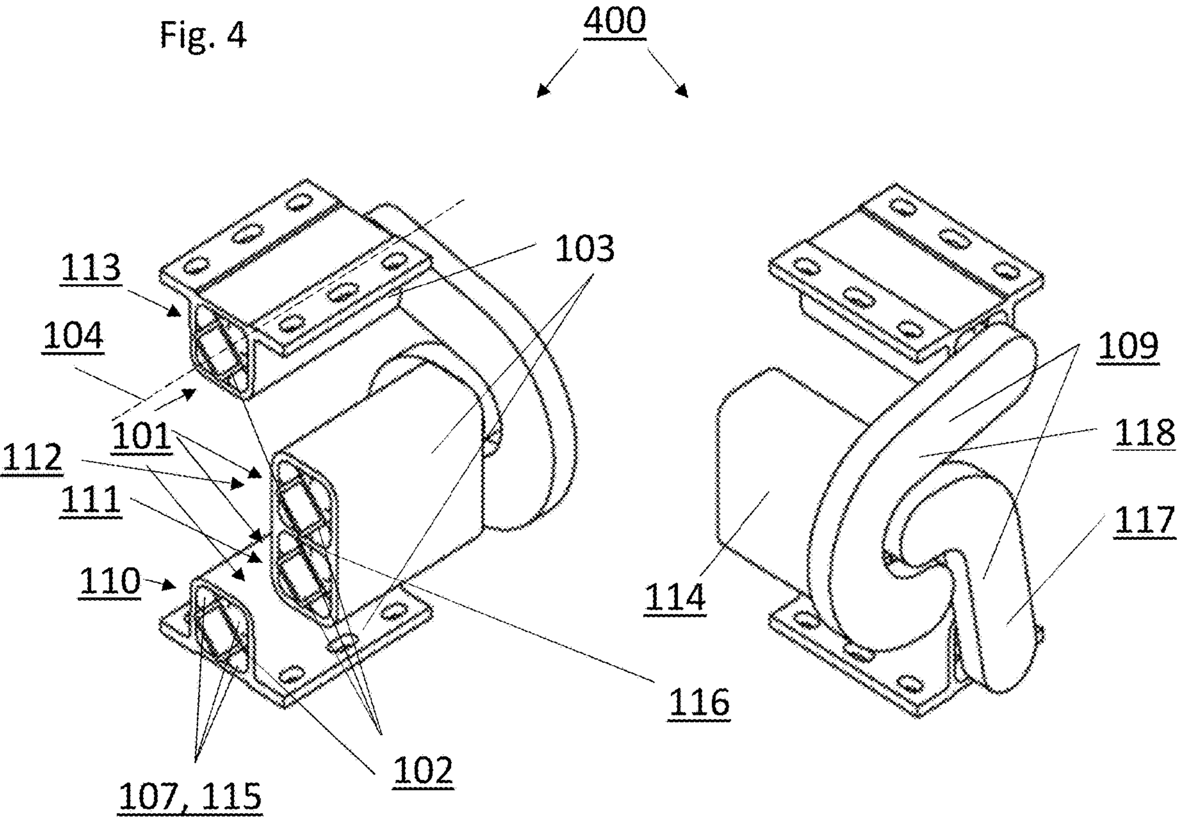
Figure 5:
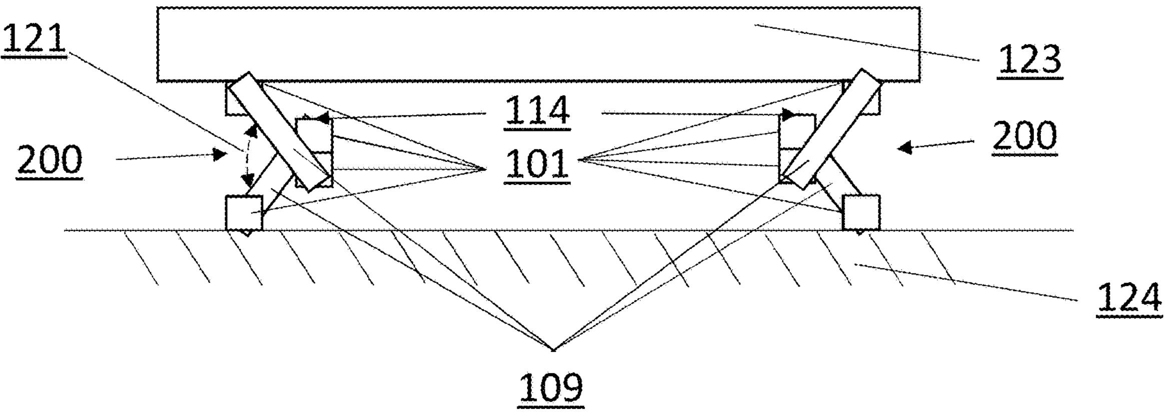

There are shown:

FIG. 1: a vibration damper according to the prior art in two different perspective views;

FIG. 2: a vibration damper according to a first embodiment, in two different perspective views;

FIG. 3: a vibration damper according to a second embodiment, in two different perspective views;

FIG. 4: a vibration damper according to a third embodiment, in two different perspective views; and FIG. 5: a vibrating conveyor system with vibration dampers in a lateral view.

FIG. 1 shows schematically a vibration damper 100 according to the prior art in two different perspective views. The vibration damper 100 can also be designated as vibration element.

The vibration damper 100 has, by way of example, four torsion spring elements 101. Each torsion spring element 101 has an inner part 102 and an outer part 103. The outer part 103 has, by way of example, a metallic material; for example the outer part 103 can be embodied as a cast steel component. Furthermore, it is possible that the outer part 103 has at least one plastic and/or at least one metallic material. The outer part 103 can, however, also have another material or another material combination.

According to the exemplary embodiment of FIG. 1, the outer part 103 has along a longitudinal direction 104 a hollow square profile with open ends. Longitudinal edges 105 of the outer part 103 are configured in a rounded manner by way of example parallel to the longitudinal direction 104 on an inner side (inner edge) and/or on an outer side (outer edge). In alternative embodiments, the outer part 103 can also be embodied for example as a hollow polygonal profile with a polygonal, n-cornered cross-section or as a hollow body with a circular, oval or differently shaped cross-section, wherein the longitudinal edges 105 can be rounded on the inner side and/or on the outer side of the outer part 103. In preferred embodiments, the longitudinal edges 105 of the outer part 103 have a length of up to 500 mm, and edges transversely to the longitudinal direction 104 have a length of up to 100 mm. The dimensions of the outer part 103 are, however, not restricted to the indicated ranges of values.

The inner part 102, along the longitudinal direction 104, likewise has by way of example a hollow square profile with open ends. Longitudinal edges of the inner part 102 are likewise configured in a rounded manner by way of example parallel to the longitudinal direction 104 on an inner side (inner edge) and/or on an outer side (outer edge). In alternative embodiments, the inner part 102 can be embodied for example also as a hollow polygonal profile with a polygonal, n-cornered cross-section, or as a hollow body with a circular, oval or differently shaped cross-section, wherein the longitudinal edges on the inner side and/or on the outer side of the inner part 102 can be rounded. The outer part 103 and the inner part 102 can have the same material or different materials. In an embodiment, the inner part 102 has for example a metallic material. The inner part 102 can, however, have a different material or a different material combination.

The inner part 102 is arranged in the outer part 103. Here, the ends of the inner part 102 project by way of example along the longitudinal direction 104 out from the outer part 103, whereby for example a fastening of components not belonging to the vibration damper 100 can be simplified, for example elements of a machine which are to be spring-mounted or are to be damped. The inner part 102 has by way of example a round or angular through-opening 106, which extends parallel to the longitudinal direction 104 through the inner part 102. The through-bore 106 serves for the connecting of the inner part 102 to a connecting element 108, for example to a shaft, a rod or to a bolt. Optionally, it is possible that the through-bore 106 is provided, at least in its opening regions, with an internal thread or another fastening structure.

In alternative embodiments, instead of a through-bore 106, on the face side of the inner part 102 for example respectively a blind bore can be provided, which can be respectively provided with a thread or with another fastening structure. In alternative embodiments, instead of a round through-bore 106 or round blind bores, differently shaped through-holes or blind holes can be provided, for example holes with a polygonal cross-section, which can be respectively provided with a thread or with another fastening structure. The inner part 102 can also have a plurality of through-bores 106, blind bores or other through-holes 106 and blind holes running parallel to one another for connecting to a connecting element 108 or to a plurality of connecting elements 108.

The outer part 103 and the inner part 102 have, with regard to their geometry, cross-section shapes corresponding to one another by way of example, as respectively a square profile is concerned. In alternative embodiments the outer part 103 and the inner part 102 can also have other shapes, in particular different from one another. For example, the inner part 102 have a triangular profile. The outer part 103 can for example likewise have a triangular profile. The outer part 103 can, however, also have a round cross-section. The inner part 102 is arranged in the outer part 103 such that outer edges of the inner part 102 are arranged facing inner faces of the outer part 103.

Each torsion spring element 101 has respectively a plurality of resilient elements 107 arranged between the inner part 102 and the outer part 103. The resilient elements 107 lie respectively adjacent to outer faces of the inner part 102 and adjacent to inner faces and/or inner edges of the outer part 103. The inner part 102 is arranged in the outer part 103 such that cavities 115 formed between the inner part 102 and the outer part 103 respectively have a substantially triangular cross-section in the present geometry perpendicularly to the longitudinal direction 104. Owing to the present geometry of the inner part 102 and of the outer part 103, the torsion spring element 101 has in total for example four cavities 115.

The resilient elements 107 are arranged in the cavities 115. Expediently, a number of the resilient elements 107 corresponds to a number of the cavities 115. The resilient elements 107 support the inner part 102 preferably centrally in the outer part 103, i.e. the inner part 102 and the outer part 103 are arranged coaxially along the longitudinal direction 104. In alternative embodiments, the inner part 102 is supported eccentrically in the outer part 103, i.e. the inner part 102 and the outer part 103 are arranged biaxially with respect to the longitudinal direction 104.

The resilient elements 107 of the torsion spring elements 101 can be inserted into the cavities 115, wherein the resilient elements 107 are compressed. The resilient elements 107 have for example a rubber or another resilient material. The resilient elements can also be designated as resilient inserts.

Before the inserting of the resilient elements 107 into the outer part 103, they can be for example initially shaped cylindrically. The resilient elements 107 extend with respect to the longitudinal direction 104 by way of example over an entire length of the outer part 103 which, however, is not absolutely necessary. A plurality of resilient elements 107 can also be arranged one behind the other with respect to the longitudinal direction 104.

The inner part 102 is supported by the resilient elements 107 relative to the outer part 103 such that in the event of a deflection caused by rotation of the inner part 102 and of the outer part 103 relative to one another, in particular in the case of an azimuthal rotation with respect to the longitudinal direction 104, and/or in the event of a linear deflection of the outer part 103 relative to the inner part 102 along and/or transversely to the longitudinal direction 104, i.e. in the case of an axial and/or radial load, a restoring force is created between the inner part 102 and the outer part 103. Through the selection of suitable materials for the outer part 103, the inner part 102 and the resilient elements 107 and/or through the selection of a suitable geometry of the outer part 103, of the inner part 102 and of the resilient elements 107, a restoring force-deflection curve and a hysteresis of the torsion spring elements 101 can be adapted to a respective application.

The torsion spring elements 101 are arranged above one another with respect to a first direction which runs perpendicularly to the longitudinal direction 104. A second torsion spring element 111 is arranged above a first torsion spring element 110. A third torsion spring element 112 is arranged above the second torsion spring element 111. A fourth torsion spring element 113 is arranged above the third torsion spring element 112. The second torsion spring element 111 is rigidly connected to the third torsion spring element 112.

The second torsion spring element 111 and the third torsion spring element 112 share a common outer part 114, through which they are rigidly connected to one another. The outer part 114 has two receiving spaces for receiving respectively an inner part 102 and at last one resilient element 107. Alternatively, it is conceivable that the second and third torsion spring element 111, 112 respectively have their own outer part 103, which are rigidly connected to one another. The receiving spaces are separated from one another by a dividing wall 116 of the outer part 114 which, however, is not absolutely necessary. The inner parts 102 of the second torsion spring element 111 and of the third torsion spring element 112 are thereby connected in series along the first direction, therefore perpendicularly to the longitudinal direction 104.

The vibration damper 100 has, furthermore, two lever elements 109. The lever elements 109 have, by way of example, a metallic material. The lever elements 109 can be produced for example by casting or by means of a printing process. The lever elements 109 are rigidly connected to the connecting elements 108 and can be, for example, welded on to the connecting elements 108. The connecting elements 108 are arranged running perpendicularly to the lever elements 109. The lever elements 109 are configured, by way of example, in a rectilinear manner, however differently shaped lever elements 109 are also explained within the scope of this description.

The lever elements 109 are arranged laterally at the open ends of the torsion spring elements 101 and are connected to the torsion spring elements 101 via the connecting elements 108. Each lever element 109 connects respectively the inner parts 102 of two torsion spring elements 101 to one another. A first lever element 117 connects the first torsion spring element 110 to the second torsion spring element 111. A second lever element 118 connects the third torsion spring element 112 to the fourth torsion spring element 113.

The vibration damper 100 can, for example, also have a total of four lever elements 109. Two further lever elements can be arranged along the longitudinal direction 104 on a side of the torsion spring elements 101 lying opposite the lever elements 109. Here, a third lever element connects the first torsion spring element 110 to the second torsion spring element 111. A fourth lever element 118 connects the third torsion spring element 112 to the fourth torsion spring element 113.

FIG. 2 shows schematically a vibration damper 200 in accordance with the invention according to a first embodiment in two different perspective views. The vibration damper 200 according to the first embodiment has similarities to the vibration damper 100 according to the prior art. In the following, only differences between the vibration dampers 100, 200 are explained. Similar or identical elements are provided in FIG. 2 with the same reference numbers as in FIG. 1.

In contrast to the vibration damper according to FIG. 1, the torsion spring elements 101 in the vibration damper 200 of FIG. 2 are connected to one another differently. The first lever element 117 connects the first torsion spring element 110 to the third torsion spring element 112. The second lever element 118 connects the second torsion spring element 111 to the fourth torsion spring element 113. Thereby, the torsion spring elements 101 are interconnected in a crosswise manner, as torsion spring elements 101, which are not immediately adjacent, are connected to one another, as is the case in the vibration damper 100 according to FIG. 1.

The vibration dampers 100, 200 can be used respectively for example to provide a sprung mounting. With the sprung mounting for example a motor or a machine can be sprung-mounted, which is advantageous in particular in unbalance motors and vibrators or respectively vibrating conveyor systems with regard to a damping of oscillations and vibrations.

For connecting the vibration dampers 100, 200, these respectively have fastening projections. The fastening projections are respectively connected rigidly to an outer part 103 of a torsion spring element 101 such that the outer part 103 can be fastened with fastening elements to a base and to a vibrating mass. A first fastening bridge is arranged on the outer part 103 of the first torsion spring element 110. A second fastening bridge is arranged on the outer part 103 of the fourth torsion spring element 114. The fastening bridges are arranged on outer sides, facing away from one another, of the outer parts 103 of the torsion spring elements 110, 114. Thereby, the first torsion spring element 110 can be connected to the base. The second torsion spring element 111 can be connected to a vibrating mass. Instead of fastening projections, fastening bridges can also be used, which are not rigidly connected to the outer parts 103, but rather are able to be applied on the outer parts 103 and can be connected by fastening elements with the base or with the vibrating mass.

In applications with high insulation requirements with regard to vibrations and oscillations, it can be advantageous to reduce as much as possible an inherent frequency of a vibration damper 100, 200. The inherent frequency is dependent on a length 119 of the lever elements 109. The longer the lever elements 109 are, the lower the inherent frequency of the vibration damper can be configured.

Longer lever elements 109 can, however, be accompanied by a reduction of a load capacity of the vibration damper 100, 200. A reduction of the load capacity can require a use of additional vibration dampers 100, 200. The load capacity of a vibration damper 100, 200 also depends on an angle 121 enclosed by the lever elements 109. The greater the angle 121 is selected, the greater is the load capacity of the vibration damper 100, 200.

A height 120 of the vibration damper 100, 200, measured perpendicularly to the longitudinal direction 104 or respectively parallel to the first direction, is increased through the use of longer lever elements 109. Thereby, also a distance of a centre of gravity of a machine, for example of a vibrating conveyor system, to a base also increases. This distance is, however, to be kept as small as possible for reasons of stability and security, which applies in particular for switching-on and switching-off processes of a vibrating conveyor system, as in these cases a resonance curve of the vibration damper 100, 200 is passed through.

In contrast to the vibration damper 100 according to the prior art, the vibration damper 200 according to the first embodiment makes it possible that longer lever elements 109 can be used, whereby the inherent frequency of the vibration damper 200 according to the invention can be particularly low. At the same time, the distance of the centre of gravity with respect to the base is reduced in that the lever elements 109 interconnect the torsion spring elements 101 according to FIG. 2 in a crosswise manner. As through this arrangement the height 120 of the vibration damper 200 according to the invention is also reduced compared to the height of the known vibration damper 100, an enlarging of the angle 121 between the lever elements 109 can counteract an excessive reduction of the load capacity of the vibration damper 200. As a whole, therefore, the length 119 of the lever elements 109, the height 120 of the vibration damper 200 and the angle 121 between the lever elements 109 can be balanced out such that desired or respectively expedient ranges of values for the inherent frequency, the load capacity and the distance of the centre of gravity with respect to the base can be achieved.

The connection of the torsion spring elements 101 of the vibration damper 200 according to the first embodiment is enabled in that the first lever element 117 and the second lever element 118 are arranged along the longitudinal direction 104 on opposite sides of the torsion spring elements 101. A one-sided arrangement of the lever elements 109 with respect to the torsion spring elements according to FIG. 1 is not possible in the case of the lever elements 109 which are configured in a rectilinear manner, as these would be in each other's way.

Furthermore, the vibration damper 200 according to the first embodiment is configured in a symmetrical manner. More precisely, the torsion spring elements 101 or respectively their outer parts 103 are arranged symmetrically with respect to a plane 122 running perpendicularly to the first direction. The plane 122 runs here parallel to the dividing wall 116 between the second torsion spring element 111 and the third torsion spring element 112. The symmetry relates to an arrangement of the outer parts 103. In this way, in the case of loads which act perpendicularly to the longitudinal direction 104 or respectively parallel to the first direction, the vibration damper 200 is compressed in the direction of the acting forces and not, for instance, obliquely. Thereby, the occurring loads are distributed equally onto the torsion spring elements 101, whereby the vibration damper 200 can be utilized particularly efficiently.

FIG. 3 shows schematically a vibration damper 300 in accordance with the invention according to a second embodiment in two different perspective views. The vibration damper 300 according to the second embodiment has similarities to the vibration damper 200 according to the first embodiment.

In the following, only differences between the vibration dampers 200, 300 are explained. Similar or identical elements are given in FIG. 3 the same reference numbers as in FIG. 2.

In contrast to the vibration damper 200 according to the first embodiment, the first lever element 117 and the second lever element 118 in the vibration damper 300 according to the second embodiment are configured in an angled manner. Thereby, the height 120 of the vibration damper 300 of the second embodiment can be embodied for example equally compared to the height 120 of the vibration damper 200 of the first embodiment, but the resilient elements 107 can be mounted or respectively joined together more simply with the inner parts 102 and with the outer parts 103. The resilient elements 107 in the vibration damper 300 can be assessed better visually than in the vibration damper 200.

FIG. 4 shows schematically a vibration damper 400 in accordance with the invention according to a third embodiment in two different perspective views. The vibration damper 400 according to the third embodiment has similarities to the vibration damper 300 according to the second embodiment. In the following, only differences between the vibration dampers 300, 400 are explained. Similar or identical elements are given in FIG. 4 the same reference numbers as in FIG. 3.

In contrast to the vibration damper 300 according to the second embodiment, the first lever element 117 and the second lever element 118 in the vibration damper 400 according to the third embodiment are arranged in a one-sided manner on the torsion spring elements 101 along the longitudinal direction 104. This is enabled in that the first lever element 117 is configured for example in an angled manner, and the second lever element 118 is configured for example in a bent manner, and the first lever element 117 and the second lever element 118 are arranged engaging into one another. Here, the first lever element 117 and the second lever element 118 are, however, at least spaced apart from one another such that they do not abut one another in the event of loading of the vibration damper 400.

The vibration damper 400 according to the third embodiment makes it possible that the resilient inserts 107 on the side facing away from the lever elements 117, 118 can be inserted more easily into the inner parts 102.

According to an alternative embodiment, additional lever elements can be arranged on the side of the vibration damper 400 lying opposite the lever elements 109. In this case, the vibration damper 400 has in total four lever elements 109. The additional lever elements connect the same torsion spring elements 101 as the lever elements 109. The additional lever elements 109 therefore also connect the torsion spring elements 101 in a crosswise manner. Each torsion element 101 is thus provided on both sides with lever elements 109. Thereby, the force absorption is distributed onto more lever elements 109.

All the vibration dampers 200, 300, 400 which are described here can be configured respectively as one-piece cast steel components, wherein respectively at least the inner part 102, the connecting elements 108 and the lever elements 109 form the one-piece cast steel component.

FIG. 5 shows schematically a vibrating conveyor system 500 in a lateral view. The vibrating conveyor system 500 can be configured for example as a linear vibrator or as a circular vibrator. Similar or identical elements are given in FIG. 5 the same reference numbers as in FIG. 2.

The vibrating conveyor system 500 has a vibrating mass 123 and, by way of example, a total of four vibration dampers 200, only two of which are illustrated in the view of FIG. 5. More or fewer than four vibration dampers 200 can also be provided. Only by way of example, the vibrating conveyor system 500 has the vibration dampers 200 according to the first embodiment. The vibrating conveyor system 500 can, however, also have vibration dampers 300, 400 according to the second or the third embodiment. The vibration dampers 200 are connected to the vibrating mass 123 and the base 124. For this, the fastening projections or fastening bridges which have already been explained can be used. The alignment of the vibration dampers 200 is indicated only by way of example, wherein the shared outer parts 114 of the respectively second and third torsion spring element 112, 113 of the vibration dampers 200 are arranged facing one another. However, they can for example also be arranged facing away from one another or can be arranged pointing in a shared direction. In the latter case, a first outer part 114 of a first vibration damper 200 is arranged facing a second vibration damper 200, whereas a second outer part 114 of a second vibration damper 200 is arrange facing the first vibration damper 200.

LIST OF REFERENCE NUMBERS

100 vibration damper according to the prior art
101 torsion spring elements
102 inner part
103 outer part
104 longitudinal direction
105 longitudinal edges of the outer part
106 through-bore
107 resilient element
108 connecting element
109 lever element
110 first torsion spring element
111 second torsion spring element
112 third torsion spring element
113 fourth torsion spring element
114 shared outer part of the second and third torsion spring element
115 cavity
116 dividing wall
117 first lever element
118 second lever element
119 length of the lever elements
120 height of the vibration damper
121 angle between the lever elements
122 plane of symmetry of the vibration damper
123 vibrating mass
124 base
200 vibration damper according to the first embodiment
300 vibration damper according to the second embodiment
400 vibration damper according to the third embodiment
500 vibrating conveyor system

The invention claimed is:

1. A vibration damper (200, 300, 400) comprising four torsion spring elements (101), wherein each torsion spring element (101) has an inner part (102), an outer part (103) and at least one resilient element (107), wherein the inner part (102) is located in the outer part (103), wherein the resilient element (107) is located between the inner part (102) and the outer part (103), and supports the inner part (102) relative to the outer part (103) such that in the event of a deflection of the inner part (102) and of the outer part (103) relative to one another, a restoring force is created between the inner part (102) and the outer part (103), wherein the torsion spring elements (101) are located one above the other with respect to a first direction, wherein a second torsion spring element (111) is located above a first torsion spring element (110), wherein a third torsion spring element (112) is located above the second torsion spring element (111), wherein a fourth torsion spring element (113) is located above the third torsion spring element (112), wherein the outer part (103) of the first torsion spring element (110) is configured for the rigid connecting of the vibration damper (200, 300, 400), wherein the inner part (102) of the first torsion spring element (110) is rigidly connected to the inner part (102) of the third torsion spring element (112), wherein the second torsion spring element (111) is rigidly connected to the third torsion spring element (112), wherein the inner part (102) of the second torsion spring element (111) is rigidly connected to the inner part (102) of the fourth torsion element (113), wherein the outer part (103) of the fourth torsion element (113) is configured for the rigid connecting of the vibration damper (200, 300, 400).

2. The vibration damper (200, 300) according to claim 1, wherein the torsion spring elements (101) are rigidly connected to one another via lever elements (109), wherein the first lever element (117) and the second lever element (118) are arranged along a longitudinal direction (104) running perpendicularly to the first direction on opposite sides of the torsion spring elements (101).

3. The vibration damper (400) according to claim 1, wherein the torsion spring elements (101) are rigidly connected to one another via lever elements (109), wherein the first lever element (117) and the second lever element (118) are arranged along a longitudinal direction (104) running perpendicularly to the first direction in a one-sided manner on the torsion spring elements (101).

4. The vibration damper (300, 400) according to claim 2, wherein the lever elements (109) are configured in an angled and/or bent manner.

5. The vibration damper (400) according to claim 3, wherein the lever elements (109) are arranged engaging into one another.

6. The vibration damper (200, 300, 400) according to claim 1, wherein the torsion spring elements (101) are arranged symmetrically with respect to a plane (122) running perpendicularly to the first direction.

7. The vibration damper (200, 300, 400) according to claim 1, wherein each outer part (103) of the torsion spring elements (101) has a hollow polygonal profile, wherein each inner part (102) of the torsion spring elements (101) has a polygonal profile, wherein respectively an inner part (102) is arranged in an outer part (103) of a torsion spring element (101) such that outer edges of the inner parts (102) are arranged respectively facing inner faces of the outer parts (103), wherein each torsion spring element (101) has a plurality of resilient elements (107) arranged between the inner part (102) and the outer part (103), wherein the resilient elements (107) lie respectively adjacent to outer faces of the inner part (102) and adjacent to inner faces and/or inner edges of the outer part (103).

8. A vibrating conveyor system (500) comprising a vibrating mass (123) and a plurality of vibration dampers (200, 300, 400) according to claim 1, wherein each vibration damper (200, 300, 400) is able to be connected to a vibrating mass (123) and to a base (124).

* * * * *